US010489306B2

(12) United States Patent
Bolbenes et al.

(10) Patent No.: US 10,489,306 B2
(45) Date of Patent: Nov. 26, 2019

(54) APPARATUS AND METHOD FOR PROCESSING DATA, INCLUDING CACHE ENTRY REPLACEMENT PERFORMED BASED UPON CONTENT DATA READ FROM CANDIDATES SELECTED USING VICTIM SELECTION

(71) Applicant: ARM Limited, Cambridge (GB)

(72) Inventors: Guillaume Bolbenes, Antibes (FR); Jean-Paul Georges Poncelet, Antibes (FR)

(73) Assignee: ARM Limited, Cambridge (GB)

( * ) Notice: Subject to any disclaimer, the term of this patent is extended or adjusted under 35 U.S.C. 154(b) by 145 days.

(21) Appl. No.: 15/156,484

(22) Filed: May 17, 2016

(65) Prior Publication Data

US 2017/0337133 A1 Nov. 23, 2017

(51) Int. Cl.
*G06F 12/12* (2016.01)
*G06F 12/126* (2016.01)

(52) U.S. Cl.
CPC ........ *G06F 12/126* (2013.01); *G06F 2212/68* (2013.01)

(58) Field of Classification Search
None
See application file for complete search history.

(56) References Cited

U.S. PATENT DOCUMENTS

| | | | | |
|---|---|---|---|---|
| 2004/0078526 A1* | 4/2004 | Zhang | ................... | G06F 12/123 711/134 |
| 2006/0271760 A1* | 11/2006 | Nicolai | ............... | G06F 12/1036 711/207 |
| 2008/0229052 A1* | 9/2008 | Ozer | ..................... | G06F 12/126 711/202 |
| 2008/0263341 A1* | 10/2008 | Ozer | ...................... | G06F 9/383 712/239 |
| 2010/0205344 A1* | 8/2010 | Caprioli | .............. | G06F 12/1063 711/3 |
| 2011/0153949 A1* | 6/2011 | Olszewski | .......... | G06F 12/1027 711/133 |
| 2014/0006717 A1* | 1/2014 | Steely, Jr. | ........... | G06F 12/0862 711/133 |
| 2015/0356029 A1* | 12/2015 | Craske | ................ | G06F 12/1441 711/163 |
| 2017/0315921 A1* | 11/2017 | Hooker | ............... | G06F 12/0846 |

* cited by examiner

*Primary Examiner* — Hiep T Nguyen
(74) *Attorney, Agent, or Firm* — Nixon & Vanderhye, P.C.

(57) ABSTRACT

A data processing system incorporates a cache system having a cache memory and a cache controller. The cache controller selects for cache entry eviction using a primary eviction policy. This primary eviction policy may identify a plurality of candidates for eviction with an equal preference for eviction. The cache controller provides a further selection among this plurality of candidates based upon content data read from those candidates themselves as part of the cache access operation which resulted in the cache miss leading to the cache replacement requiring the victim selection. The content data used to steer this second stage of victim selection may include transience specifying data and, for example, in the case of a cache memory comprising a translation lookaside buffer, page size data, type of translation data, memory type data, permission data and the like.

19 Claims, 2 Drawing Sheets

Figure 1:
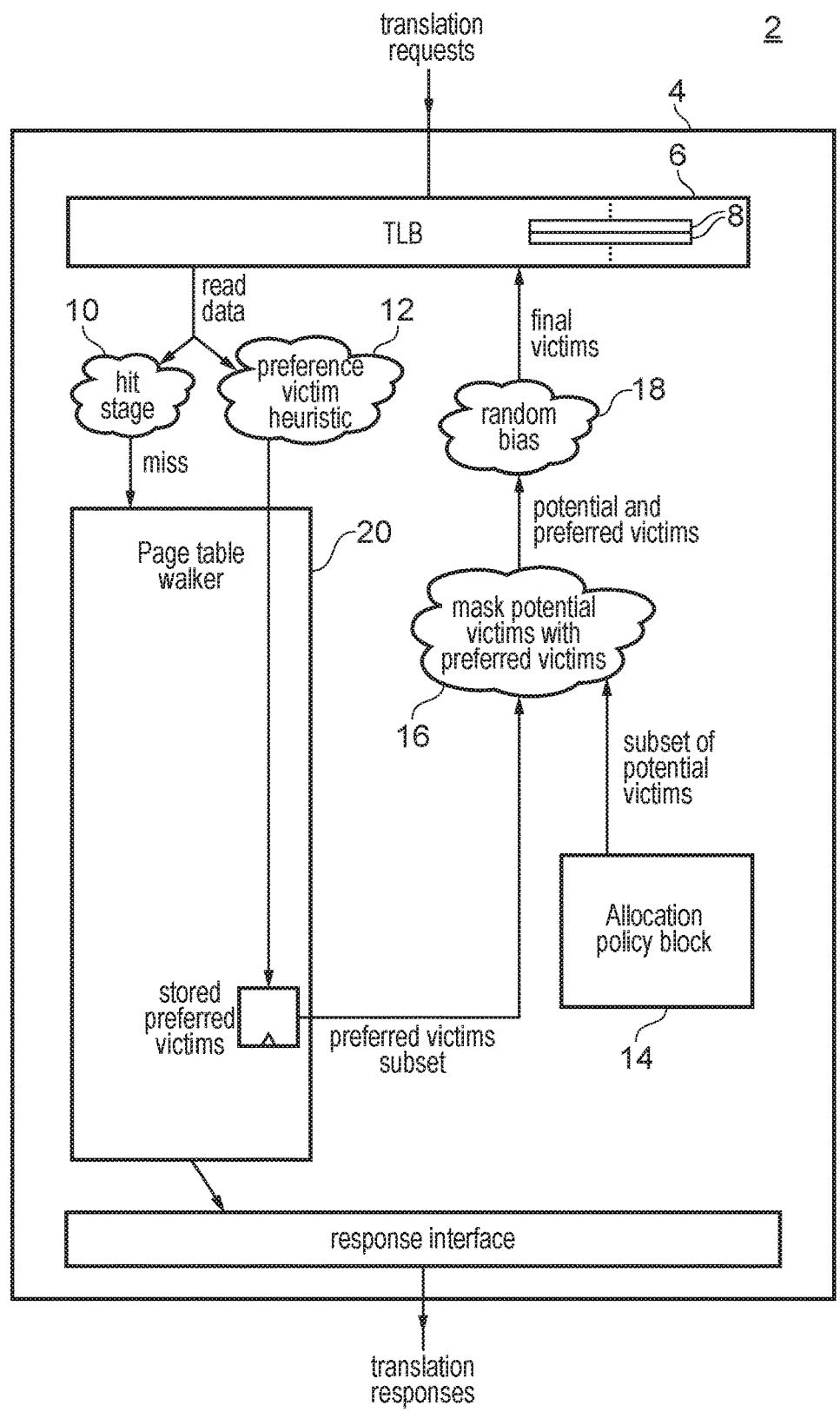

APPARATUS AND METHOD FOR PROCESSING DATA, INCLUDING CACHE ENTRY REPLACEMENT PERFORMED BASED UPON CONTENT DATA READ FROM CANDIDATES SELECTED USING VICTIM SELECTION

BACKGROUND

Field

This disclosure relates to the field of data processing systems. More particularly, this disclosure relates to cache entry replacement within data processing systems including a cache memory.

Description

It is known to provide data processing systems with cache memories for storing cache entries in order to allow more rapid and efficient access to the content data stored in those cache entries. The cache memories can take a variety of different forms, such as data caches, instruction caches, translation lookaside buffers storing translation and permission data, cache memories at various different levels within a cache hierarchy, etc.

Cache memories have a finite storage capacity and accordingly when it is desired to store a further cache entry within the cache memory, then it may be necessary to evict a cache entry which is already present within the cache memory in order to provide storage space for the new cache entry. In order to select which cache entry should be evicted in order to make space for a new cache entry, there are a variety of known cache replacement mechanisms which utilize respective eviction policies, such as round robin, least recently used, random, etc. A goal with such eviction policies is to select the victim cache entry to be evicted as the cache entry least likely to be needed again in further processing by the system, or in accordance with some other characteristic (e.g. cache lock down for retaining data or instructions needed for time critical processing whilst permitting eviction of data or instructions not required for time critical processing).

Generally speaking, as the sophistication of the cache replacement mechanism and the eviction policy increases, this may improve the "quality" of the victim selection made in accordance with the desired aim of the eviction policy, but will generally be accompanied by an increase in overhead associated with the cache replacement mechanism and eviction policy, such as the sophistication of the logic required to implement the policy, or additional data storage required to track line-by-line characteristics of cache entry use to be employed by the eviction policy.

SUMMARY

At least some example embodiments of the present disclosure provide apparatus for processing data comprising:
a cache memory to store a plurality of cache entries; and
a cache controller to control eviction of cache entries from said cache memory; wherein
said cache controller during an attempted cache access operation resulting in a cache miss at least partially reads content data stored within one or more candidates for eviction consequent to said cache miss and, when said one or more candidates for eviction comprises a plurality of candidates for eviction with an equal preference for eviction in accordance with a primary eviction policy, said cache controller performs a selection of an eviction target from among said plurality of candidates in dependence upon said content data.

At least some example embodiments of the present disclosure provide apparatus for processing data comprising:
a cache means for storing a plurality of cache entries; and
cache control means for controlling eviction of cache entries from said cache means; wherein
said cache control means during an attempted cache access operation resulting in a cache miss at least partially reads content data stored within one or more candidates for eviction consequent to said cache miss and, when said one or more candidates for eviction comprises a plurality of candidates for eviction with an equal preference for eviction in accordance with a primary eviction policy, said cache control means performs a selection of an eviction target from among said plurality of candidates in dependence upon said content data.

At least some example embodiments of the present disclosure provide a method of processing data comprising:
storing a plurality of cache entries within a cache memory; and
controlling eviction of cache entries from said cache memory; wherein
said controlling comprises during an attempted cache access operation resulting in a cache miss at least partially reading content data stored within one or more candidates for eviction consequent to said cache miss and, when said one or more candidates for eviction comprises a plurality of candidates for eviction with an equal preference for eviction in accordance with a primary eviction policy, performing a selection of an eviction target from among said plurality of candidates in dependence upon said content data.

Figure 2:
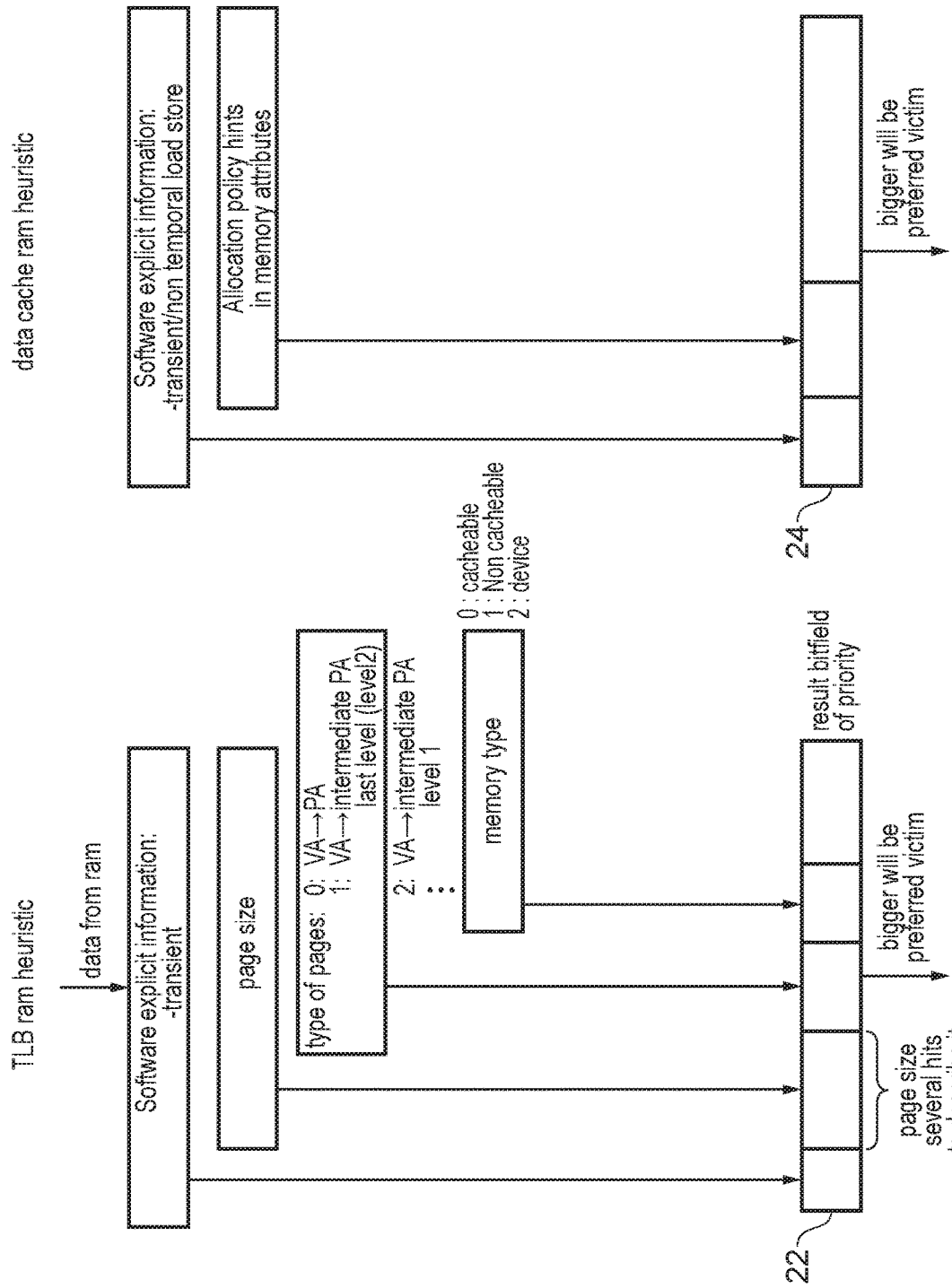

Example embodiments will now be described, by way of example only, with reference to the accompanying drawings in which:

FIG. 1 schematically illustrates a cache memory in the form of a translation lookaside buffer and incorporating a cache controller for controlling cache entry eviction; and FIG. 2 schematically illustrates the use of content data stored within a cache entry in controlling selection of an eviction target from among a plurality of candidates identified with a primary eviction policy as having an equal preference for eviction.

EMBODIMENTS

FIG. 1 schematically illustrates a portion of a data processing system 2 comprising a cache system 4 which includes a cache memory 6 for storing a plurality of cache entries. In this example, the cache memory 6 is a translation lookaside buffer (TLB) for storing translation and permission data. The translation data and the permission data is specified on a per memory page basis within a memory address space of the data processing system 2. For example, page tables may be employed specifying address translations between virtual addresses as generated by executed program instructions and physical addresses to be applied to a memory system, such as RAM, non-volatile memory, memory mapped devices and the like. Permission data may also be specified within the page tables on a per memory page basis specifying permission attributes and other attributes associated with the page of memory addresses concerned. For example when operating at different levels of privilege, the data processing system 2 may have different rights of access to memory addresses within a give memory page, such as read only access, write only access, read and write access, no access, execute access and the like. The memory pages may also specify characteristics of the memory addresses, such as whether or not data read from those memory addresses may be stored within caches of the data processing system 2 (i.e. whether the data concerned is cacheable or non-cacheable), whether the memory addresses correspond to device memory (i.e. memory mapped input output devices or other devices for which particular access constraints should be observed, e.g. access should not be reordered) or the like.

The page table data may further specify data for a memory page indicating whether the memory addresses within that memory page are storing transient data or non-transient data. Data marked as transient indicates that the data is likely to be accessed one or more times within a short period of time, but thereafter is unlikely to be accessed again for a relatively long period of time. i.e. the data concerned is of short term use. Data or instructions which have been fetched and stored within a data or instruction cache using the page table data including transient specifying parameters may accordingly be marked as either transient or non-transient. Thus, the transient or non-transient nature of a data item or an instruction may be specified within the page table data relating to the memory page to which that data item or instruction is mapped. It is also possible that particular program instructions executed by the data processing system 2 may explicitly indicate that a data item access is either transient or non-transient. Thus, an individual program instruction may, for example, load a data item from memory and indicate as part of the instruction that the data item concerned is of transient interest. This is an alternative or an additional mechanism by which a data item or instruction may have its transiences specified. Page table data relating to the translation and other properties of the memory page which is marked as containing data or instruction items of transient interest may itself be a page table data entry which inherits its own transience characteristic from the data items to which it relates and accordingly the page table entry itself may be marked as transient within the translation lookaside buffer 6.

Further types of characteristics associated with page entries within the translation lookaside buffer 6 include page size characteristics indicating a memory page size associated with an entry within the translation lookaside buffer 6, e.g. a page may be 4 kB or 64 kB in size. Furthermore, the translation data specified within an entry within the translation lookaside buffer 6 may have a different variety of forms, such as representing a full translation from a virtual address VA to a physical address PA, or one or more levels of partial translation such as between a virtual address VA and an intermediate physical address PA of a variety of different levels, such as a last level translation representing the translation of the least significant bits of the address, or a higher level translation representing the translation of bits of an address intermediate within the virtual address VA.

The translation lookaside buffer 6 within the cache system 4 of FIG. 1 is illustrated as including a plurality of cache lines 8 each storing a cache entry. When a cache entry eviction is to be made, then one of the cache lines 8 is selected as the victim cache line into which the new cache entry is to be written (possibly with a write back of the existing cache entry depending upon the nature of the cache concerned—translation lookaside buffers do not typically require write back). A cache controller associated with the translation lookaside buffer (cache memory) 6 performs a variety of different cache control tasks and is schematically illustrated in FIG. 1 by a plurality of circuit elements 10, 12, 14, 16, 18 for performing different aspects of some of the overall cache control as will be described further below. It will be appreciated that in practice, the cache controller may take the form of additional or alternative circuit elements and the particular arrangement and sub division of these circuit elements will vary between different implementations.

When a translation request is received by the translation lookaside buffer 6, then a read is made of the one or more cache entries which may potentially be storing the required translation, permission and other characteristic data needed to fulfill the translation request. In the case of, for example, a four-way set associative cache (TLB), there are potentially four cache lines 8 which may be storing the required cache entry. The present techniques are not limited to set associative caches of other particular forms of cache may also be used. As previously mentioned, the present techniques are also not limited to use within translation lookaside buffers, and may be applied to other forms of cache memory, such as data caches, instruction caches, unified caches storing both data and instructions, low level caches tightly bound to a processor or higher level caches shared between multiple entities within an overall data processing system.

In order to determine whether or not the requested data is present within the candidate cache lines 8 which may be storing that data, at least some of the content data from those candidate cache lines 8 is read out therefrom, e.g. TAG data to be compared with a high order portion of a virtual address to be translated. This read data is passed from the translation lookaside buffer 6 to a hit stage 10 within the cache controller where a comparison is made to see if any of the cache lines indicate by their content data that they match the virtual address associated with the received translation request. If there is a miss within the translation lookaside buffer 6, then page table walking circuitry 20 performs a page table walk through page table data, such as multi-stage page table data, and/or guest and hypervisor page table data. The page table walker 20 subsequent to a miss returns the required translation, permission and other characteristic data for the translation request to be stored into the translation lookaside buffer 6 for subsequent use. If all of the candidate locations where that new entry may be stored are already occupied, then a selection of a victim cache entry must be made and the corresponding victim cache entry removed from the translation lookaside buffer 6 and replaced by the newly returned data to form a new cache entry.

In this example embodiment, an allocation policy block 14 is used to implement a primary eviction policy to be applied for victim selection. This primary eviction policy could take a variety of different forms such as, for example, a re-referenced interval eviction policy or a bimodal re-referenced interval prediction eviction policy. These are only two examples of eviction policies which may be used as the primary eviction policy. Further eviction policies may also be employed. The eviction policies employed are ones in which it is possible, depending upon the state of the system at a given point in time, that a plurality of candidates for eviction are identified by the primary eviction policy as having an equal preference for eviction. Thus, for example, if the translation lookaside buffer 8 was 8-way set associative and all of these eight ways were locations where a potential new entry could be stored are already holding data, then the primary eviction policy may indicate that, for example, four of the eight cache entries are candidates for eviction having an equal preference for eviction with the other four entries not being candidates for eviction. It will be appreciated that this is only one example of how the primary eviction policy may operate with a particular form of cache memory being a translation lookaside buffer 6 that is 8-way set associative. Having identified a subset comprising four cache entries which are potential victims in accordance with the primary eviction policy, a selection may then be performed to select among this subset of potential victims the actual victim to be used. This final selection is at least partially guided by content data read from the potential victims.

In parallel with the previously discussed supply of the data read from the candidate entries in order to identify whether or not a cache hit occurred, the read data is also supplied to preference victim heuristics circuitry 12 where eviction preference values are determined in dependence upon the content data that is read from the cache entries. It will be appreciated that the content data has already been read as part of identifying whether or not there is a cache hit, and accordingly little or no additional energy or time need be consumed in calculating the eviction preference values. The way in which the eviction preference values are determined in detail is discussed further below, but in a broad sense the preference victim heuristics circuitry 12 calculates eviction preference values in dependence upon read content data and stores these values such that they can be used to select between the subset of potential victims which is determined by the allocation policy block 14 using the primary eviction policy. More particularly, mask circuitry 16 serves to receive data identifying the subset of potential victims identified in accordance with the primary eviction policy by the allocation policy block 14 and masks this with the eviction preference values determined heuristically from the content data of the potential victims themselves in order to determine one or more entries to be used as the actual victim. It may be that two or more of the eviction preference values which are calculated are equal and so even after combination of the selection made by the allocation policy block 14 and selection in accordance with the eviction preference values, there are still more than one candidate cache entry for eviction with an equal preference for eviction. In this case, random bias circuitry 18 randomly selects between such multiple potential victims and a final victim is accordingly selected.

It will be appreciated from the above discussion that victim selection is performed in multiple stages. In a first stage, a primary eviction policy is applied, such as one of re-referenced interval prediction or bimodal re-referenced interval prediction as previously discussed. Other additional and/or alternative primary eviction policies may also be used. These primary eviction policies are such that it is possible that they can identify more than one candidate for eviction with an equal preference for eviction. Among such a plurality of candidates for eviction identified by the primary eviction policy, the present technique utilizes a selection based upon content data read from the cache entries of that plurality of candidate entries in order to make a further selection. For example, an eviction preference value maybe calculated from the content data of the candidate entries and any necessary further level of victim selection may be made based upon these eviction preference values. If more than one candidate is still present with an equal preference for eviction after application of both the primary eviction policy and the selection based upon the content data, then a random selection can be made at that time. It will be appreciated that the additional refinement of the selection of the victim which is made beyond the selection made by the allocation policy block 14 is based upon content data which is already read from the cache memory 6 as a consequence of the cache access operation which resulted in the cache miss and the subsequent need for cache replacement and victim selection. Thus, the content data has already been read and its use to refine victim selection may be achieved with relatively little additional overhead (in energy or circuitry).

FIG. 2 schematically illustrates two example ways in which content data read from a cache entry may be used to control selection of a cache victim when there exists a plurality of cache victims with an equal preference for eviction selected by a primary eviction mechanism. The left hand portion of FIG. 2 illustrates how an eviction preference value may be determined using an heuristic appropriate for a TLB RAM. The right hand portion of FIG. 2 illustrates how an eviction preference value may be determined in accordance with an heuristic suitable for a data cache RAM. In the case of a TLB RAM, an eviction preference value 22 may be formed as a concatenation of values read from the content stored within a cache entry of the TLB, i.e. the preference value may be determined using translation, permission, transience, page size, translation type, memory type and other data stored as the TLB (cache) entry for a given memory page within the translation lookaside buffer 6. In particular the eviction preference value 22 may be concatenated from bit values working from high order to low order which are in turn taken from software specified transience data, page size data, a type of translation data (e.g. complete translation, partial translation etc.), a memory type (e.g. cacheable, non-cacheable, device, etc.) and other data, such as the level of permissions provided (e.g. full permission, read and write permission, write permission, read permission, execute permission, etc.). The resulting eviction preference value derived from the content data of a particular candidate entry within the translation lookaside buffer 6 which is a candidate for victim selection once determined by the preference victim heuristics circuit 12 accompanies an identifier for that cache entry which is held by the system and supplied to the mask circuitry 16 to perform any required additional selection among the subset of potential victims which are identified by the primary eviction policy using the allocation policy block 14. In the example illustrated, transience is given the greatest priority and memory type the least priority informing the eviction preference value 22. A large eviction preference value is preferred for victimhood over a small victim preference value.

More particularly, cache entries with transience characteristic data indicative of a highest degree of transience are preferentially selected to be victims over those with a transience characteristic indicative of a lower degree of transience. This transience characteristic may be programmed within the page table data accessed via page table walking or may be explicitly specified in a memory access instruction, such as a load instruction which specifies that the data concerned is transient. The page size data may be used to control a selection whereby cache entry corresponding to a smallest page size is preferentially selected.

With regard to the type of page/translation for the entries which are the potential victims, these may specify full translations between a virtual address and a physical address or partial translations between a virtual address and a physical address. The eviction preference value 22 may be formed so as to preferentially select as the victim that is replaced an entry corresponding to a partial translation, e.g. full translations are preferred for retention and are not selected as the victim. With regard to memory type, cacheable memory may be preferentially retained and accordingly not selected as the victim. More particularly, entries within the translation lookaside buffer 6 relating to cacheable pages are preferentially retained (not selected) over those relating to non-cacheable pages, which in turn are preferred over pages relating to device memory.

The right hand portion of FIG. 2 relates to the forming of an eviction preference value 24 in respect of a data cache RAM. In this case, the eviction preference value 24 may be formed as a concatenation of a software specified transience characteristic, such as inherited from page table data or specified by the use of a non-temporal load/store instruction. This transience specifying parameter is also combined with any allocation policy hint data which is provided within memory attributes for the entry within the data cache RAM. Thus, while the content data of a data cache RAM is less rich in characteristics which can be used to steer victim selection, it nevertheless may contain some parameters which may be used to steer victim selection when the primary eviction policy for the data cache RAM has identified two or more candidate cache entries as a subset of cache entries having an equal preference for eviction.

Although illustrative embodiments have been described in detail herein with reference to the accompanying drawings, it is to be understood that the claims are not limited to those precise embodiments, and that various changes, additions and modifications can be effected therein by one skilled in the art without departing from the scope and spirit of the appended claims. For example, various combinations of the features of the dependent claims could be made with the features of the independent claims.

We claim:

1. Apparatus for processing data, comprising:
a cache memory to store a plurality of cache entries; and
a cache controller to control eviction of cache entries from said cache memory; wherein
said cache controller during an attempted cache access operation resulting in a cache miss at least partially reads content data stored within one or more candidates for eviction consequent to said cache miss and, when said one or more candidates for eviction comprise a plurality of candidates for eviction with an equal preference for eviction in accordance with a primary eviction policy, said cache controller performs a selection of an eviction target from among said plurality of candidates for eviction by masking data identifying said plurality of candidates for eviction with eviction preference values determined heuristically from said content data of said plurality of candidates for eviction, read during said attempted cache access operation resulting in said cache miss.

2. Apparatus as claimed in claim 1, wherein said content data comprises transience characterizing data.

3. Apparatus as claimed in claim 2, wherein said selection preferentially selects as said eviction target a cache entry with transience characterizing data indicative of a highest degree of transience among said plurality of candidates.

4. Apparatus as claimed in claim 1, wherein when said selection of said eviction target identifies a plurality of eviction targets with an equal preference for eviction, then said cache controller randomly selects said eviction target from among said plurality of eviction targets.

5. Apparatus as claimed in claim 1, wherein said cache memory is a data cache memory to store data cache entries to be processed in response to program instructions executed by said apparatus.

6. Apparatus as claimed in claim 2, wherein said transience characterizing data of a given cache entry is set in dependence of a software specified characteristic of a memory access instruction triggering loading of a cache entry to said cache memory.

7. Apparatus as claimed in claim 1, wherein said content data comprises transience characterizing data and said transience characterizing data of a given cache entry is a software specified parameter associated with a memory page within a memory address space of said apparatus corresponding to said given cache entry.

8. Apparatus as claimed in claim 1, wherein said cache memory is a translation lookaside buffer memory to store at least translation data at least partially specifying a translation between a virtual address and a physical address within a memory address space of said apparatus.

9. Apparatus as claimed in claim 8, wherein said memory address space is divided into a plurality of memory pages each with a page size, and a cache entry within said translation lookaside buffer specifies translation data shared by memory addresses within a given memory page and a given page size of said given memory page.

10. Apparatus as claimed in claim 9, wherein said selection is also dependent upon page size specified within said plurality of candidates.

11. Apparatus as claimed in claim 10, wherein said selection preferentially selects as said eviction target a cache entry specifying a smallest page size among said plurality of candidates.

12. Apparatus as claimed in claim 8, wherein said translation data of a given cache entry within said translation lookaside buffer specifies one of a partial translation between said virtual address and said physical address and a full translation between said virtual address and said physical address and said selection is also dependent upon whether said translation data of said candidate entries specify partial translations or full translations.

13. Apparatus as claimed in claim 12, wherein said selection preferentially selects as said eviction target a cache entry specifying a partial translation among said plurality of candidates.

14. Apparatus as claimed in claim 8, wherein a given cache entry within said translation lookaside buffer specifies permission data indicative of permitted memory access operations for memory accesses using said translation of said given cache entry and said selection is also dependent upon said permission data of said candidate entries.

15. Apparatus as claimed in claim 14, wherein said selection preferentially selects as said eviction target a cache entry specifying fewer permitted memory access operations among said plurality of candidates.

16. Apparatus as claimed in claim 8, wherein a given cache entry within said translation lookaside buffer specifies cacheability data indicative of whether data accessed using said translation is cacheable and said selection is also dependent upon said cacheability data of said candidate entries.

17. Apparatus as claimed in claim 16, wherein said selection preferentially selects as said eviction target a cache entry with cacheability data indicative of non-cacheability among said plurality of candidates.

18. Apparatus as claimed in claim 1, wherein said primary eviction policy is a bimodal re-referenced interval prediction eviction policy.

19. A method of processing data comprising:
storing a plurality of cache entries within a cache memory; and
controlling eviction of cache entries from said cache memory; wherein said controlling comprises during an attempted cache access operation resulting in a cache miss at least partially reading content data stored within one or more candidates for eviction consequent to said cache miss and, when said one or more candidates for eviction comprise a plurality of candidates for eviction with an equal preference for eviction in accordance with a primary eviction policy, performing a selection of an eviction target from among said plurality of candidates for eviction by masking data identifying said plurality of candidates for eviction with eviction preference values determined heuristically from said content data of said plurality of candidates for eviction, read during said attempted cache access operation resulting in said cache miss.

* * * * *